Figure 4:
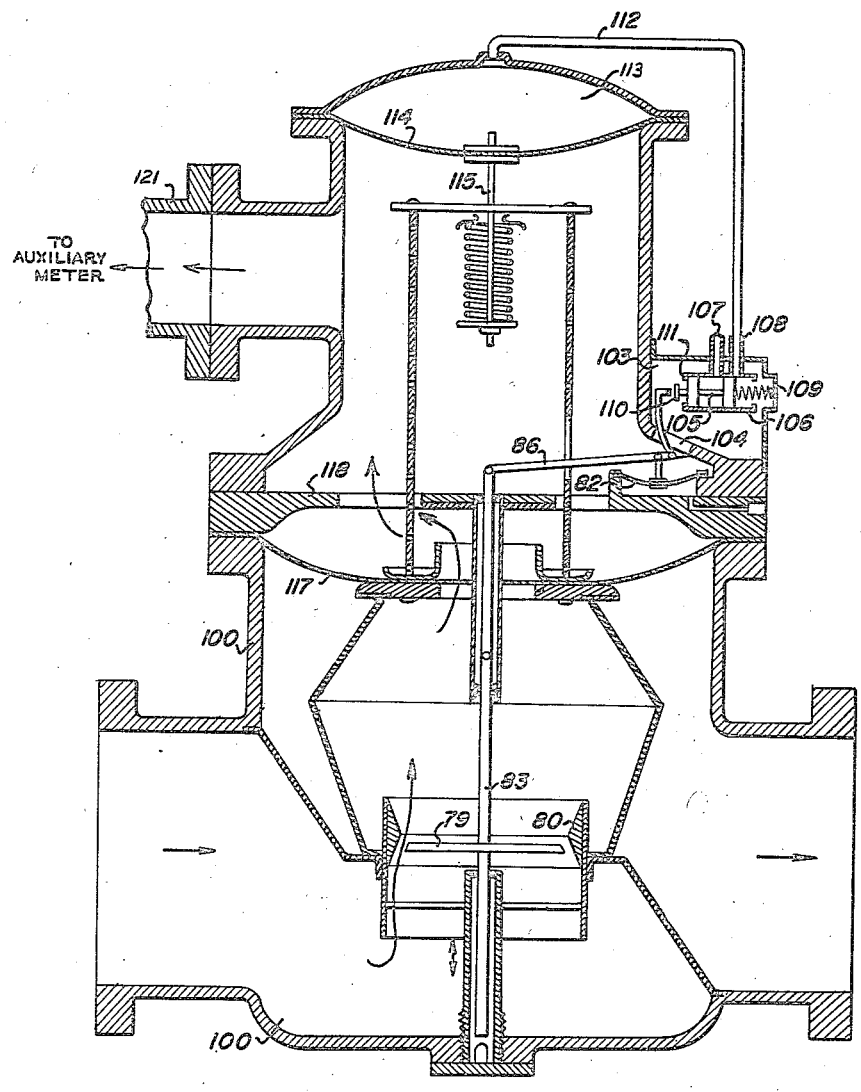

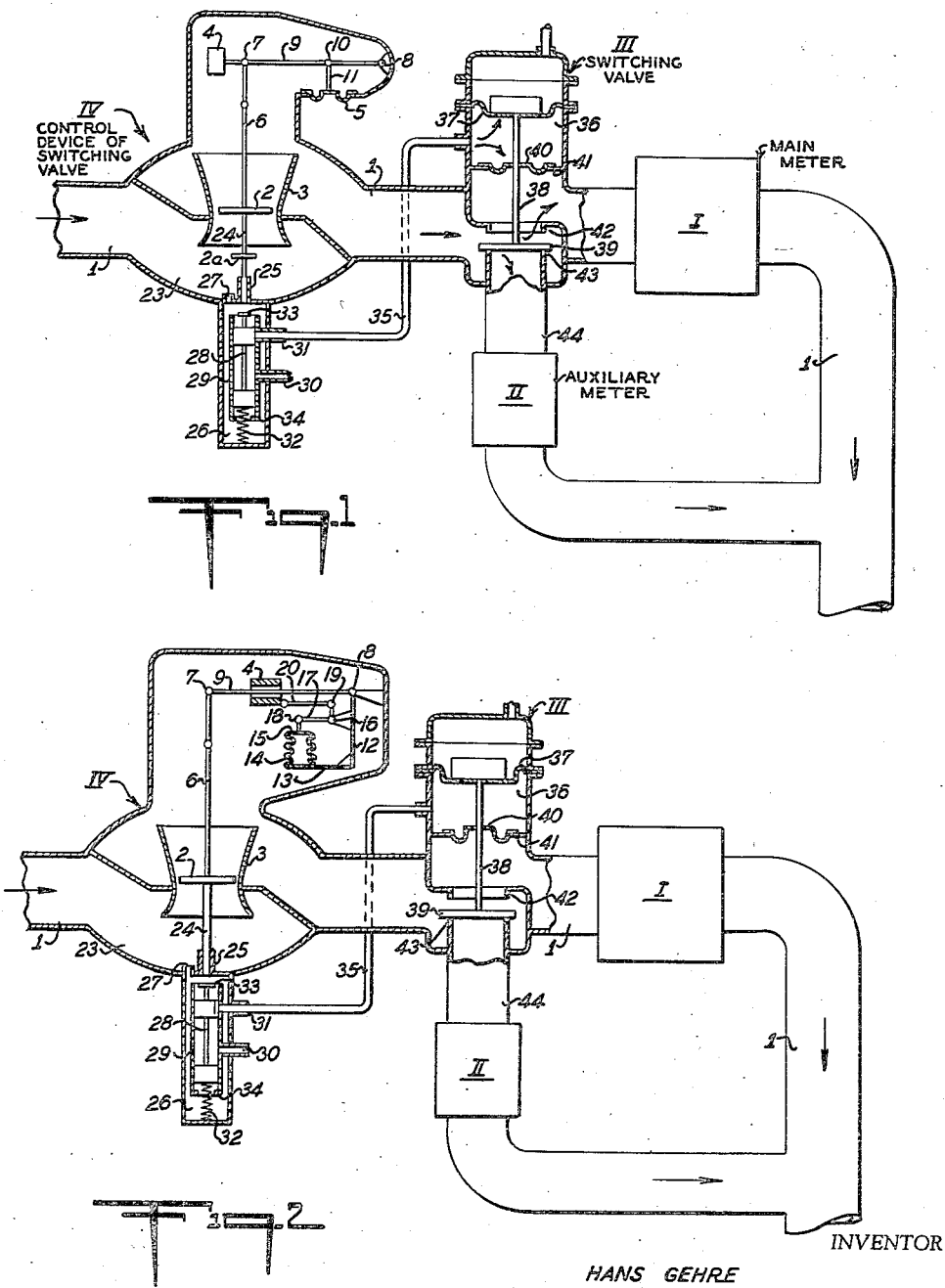

INVENTOR
HANS GEHRE

Jan. 28, 1958  H. GEHRE  2,821,085
SWITCHING DEVICE FOR GAS METERS
Filed May 16, 1952  3 Sheets-Sheet 3

INVENTOR
HANS GEHRE
BY Burgess Dinklage
ATTORNEYS

United States Patent Office 2,821,085
Patented Jan. 28, 1958

2,821,085

SWITCHING DEVICE FOR GAS METERS

Hans Gehre, Oberkassel, Siegkreis, Germany

Application May 16, 1952, Serial No. 288,265

16 Claims. (Cl. 73—197)

This invention relates to a switching device for gas metering systems. It more particularly relates to a device for the actuation of the switch over from one gas meter to another at a predetermined rate of gas flow.

In measuring the volume of gases flowing through the pipe line, it is often necessary to switch from one type of meter to another type of meter when a certain rate of flow is reached. Thus, for example, it may be desirable to use an impulse wheel type meter for measuring large flows and a pure volume meter, as for example a bellows gas meter for measuring small flows. Such metering systems which contain two independent measuring meters with a switch over from one to another at a predetermined rate of flow are usually referred to as compound gas meters.

In the known and conventional arrangements of compound gas meters of this type the switching from one meter to another was generally effected by a valve switch which was controlled by the pressure difference on opposite sides of a throttle arrangement installed in the line. This throttle arrangement generally consists of a nozzle or orifice plate or the like. This pressure difference on opposite sides of the throttle would, however, vary as a function of the rate of flow in cubic meters per second which will be referred to as Q and the square root of the specific gravity of the gas in kilograms per cubic meter which will be referred to as $\gamma$, thus the pressure difference would be a function of $$Q \cdot \sqrt{\gamma}$$

As is well known, the specific gravity of a gas varies with the absolute operating pressure. If such variation in pressure occurs the switching will not take place at the desired rate of flow Q but at some other rate of flow. This is highly undesirable and it is often absolutely necessary to effect the switch over at a very specific rate of flow.

Thus, for example, in compound meters used in high pressure lines having a bellows gas meter as the auxiliary meter to measure the lower part of the measuring range, it is of extreme importance that the switch over take place at a predetermined rate of flow independent of the operating pressure. If, as in conventional switch over devices, the switch over is dependent upon the specific gravity of the gas and thus the operating pressure a decrease in the operating pressure in the vicinity of the switching point would subject the small auxiliary meter to a rate of flow which exceeds its upper limit rate $Q_{(max)}$. This could result in the complete destruction of the auxiliary meter, especially if this overload continued for a long period of time.

This type of compound meters in which the auxiliary meter is a bellows gas meter is, however, being required in an ever increasing extent by industry, especially for installations in high pressure lines in which, as it is well known, the measurement is effected under extremely varying pressure conditions.

Figure 3:
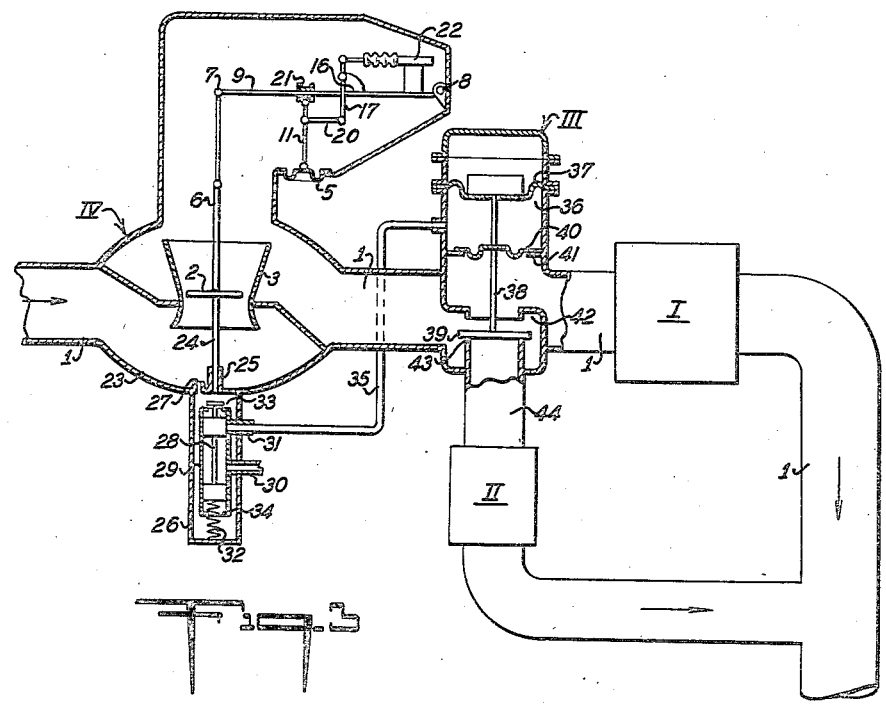

One object of this invention is a device for the actuation of the switch over from one gas meter to another at a predetermined rate of gas flow independent of the variations of the specific gravity (operating pressure and temperature of the gas to be measured). This and still further objects will become apparent from the following description read in conjunction with the drawings, in which:

Fig. 1 diagrammatically shows the switch over actuation device in accordance with the invention in combination with the means for effecting the switch over;

Fig. 2 diagrammatically shows another embodiment of a switch over actuation device in accordance with the invention in which the barometric pressure and the temperature of the gas being measured are taken into consideration;

Fig. 3 diagrammatically shows still another embodiment for the switch over actuation in accordance with the invention in cases in which the operating pressure is comparatively high and subject to strong variations;

Fig. 4 diagrammatically shows an embodiment of a complete switch over device in accordance with the invention installed in a single unit.

Figures 5, 5A, 5B:
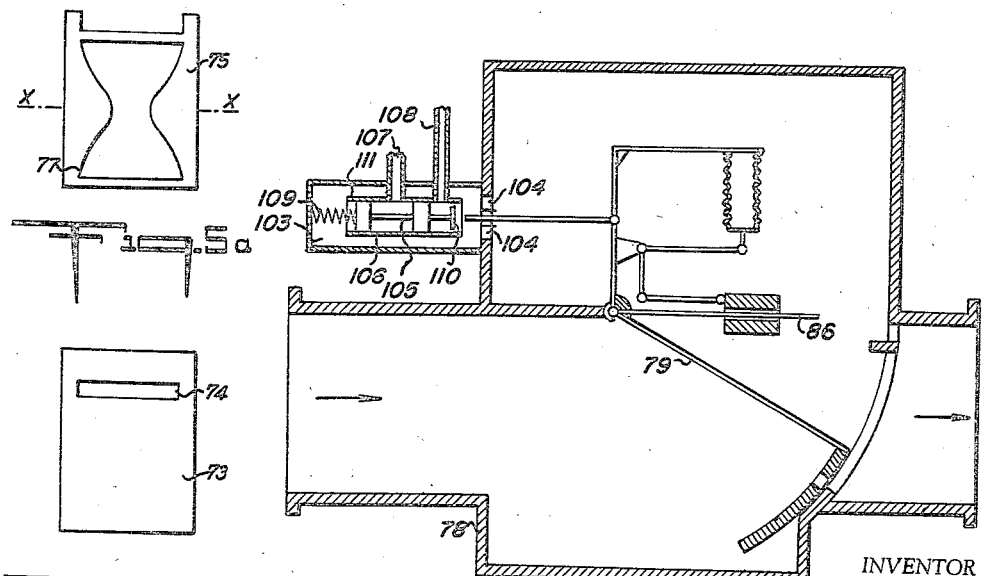

Fig. 5 diagrammatically shows a further embodiment of a switch over actuation device in accordance with the invention.

Figs. 5a and 5b diagrammatically illustrate a type of shifting control member other than a float, i. e., a flap.

As is well known the rate of gas flow Q through any flow cross section may be obtained from the following relationship $$(\text{I}) \qquad Q = c \cdot f \cdot \sqrt{\frac{\Delta p}{\gamma}}$$

In this formula $f$. is the size of the flow cross section, $c$. is a constant, $\Delta p$ is the active pressure, i. e. the active difference in pressure at a constricted place or throttle device in the line, and $\gamma$ is the specific gravity of the gas being measured.

If the gas flow is directed through a constriction device the size of flow cross section of which is variable by means of a shifting control member with a gas impinging surface such as a flap, float or the like (well known in flow meters), and if proportionality is required to be maintained between Q and $f$ for all positions of the control member, than it will be necessary to make the value $$\frac{\Delta p}{\gamma}$$

constant for all values of $\gamma$ i. e. it will be necessary to make the force urging the control member against the gas flow variable as a function of the specific gravity $\gamma$ of the gas to be measured.

According to the present invention which is directly based upon the above consideration, a shifting member having a gas impinging surface is positioned at a constricted part of the gas flow feed line to the compound meter system with a limited movement for varying the flow cross section. The gas impinging surface faces the direction of gas flow. The constriction of the gas flow feed line is preferably provided with a double cone or paraboloid shaped profile with the narrow-most zone in its middle-part. Means are positioned for urging the shifting member against the gas flow with a force which varies as a function of the specific gravity of the gas being measured.

The invention can be realized in various manners. In one embodiment, for example, the loading of the shifting member which controls the valve switch is effected by two components, a constant portion and a portion which varies as a function of the operating over-pressure. This embodiment is based on the following considerations:

According to the basic gas formula $$\frac{p \cdot V}{T} = \frac{p_0 \cdot V_0}{T_0}$$

in which V equals volume of a mass of gas at a pressure $p$ and a temperature T and $V_0$ equals the volume of the same mass of gas at normal pressure $p_0$, normal temperature $T_0$.
Thus $$V = V_0 \cdot \frac{p_0}{p} \cdot \frac{T}{T_0}$$

it is well known $$\gamma = \frac{M}{V} \qquad \gamma_0 = \frac{M}{V_0}$$

in which $\gamma$ is the specific gravity of the gas at the $p$ pressure, T temperature, $\gamma_0$ is the specific gravity of the gas at normal pressure $p_0$, normal temperature $T_0$ and M is the mass of the gas.

By substituting the specific gravities for the volumes, we have $$\frac{M}{\gamma} = \frac{M}{\gamma_0} \cdot \frac{p_0}{p} \cdot \frac{T}{T_0}$$

$$\frac{\gamma}{M} = \frac{\gamma_0}{M} \cdot \frac{p}{p_0} \cdot \frac{T_0}{T}$$

In practical gas measurements (as for instance in connection with long-distance gas supply) the temperature variations are generally unsubstantial and can normally be disregarded in the first approximation. On the other hand, the variations in the operating pressure cannot be neglected. These pressure variations are due to changes in the operating over-pressure and the barometric pressure. If the average barometric pressure is considered constant, changes in the specific gravity will depend only on the changes in the operating over-pressure.

If now assuming the temperature and the barometric pressure to remain constant, the quantity $$\gamma_0 \cdot \frac{T_0}{T \cdot p_0}$$

will be a constant. If $p$ is taken as the absolute operating pressure then $p$ will equal $p_{\ddot{u}}$ plus $ba$, where $p_{\ddot{u}}$ is the operating or working pressure in excess of barometric pressure and will be referred to as the operating overpressure.

Combining these equations with the equation derived from the basic gas formula $$\gamma = \gamma_0 \cdot \frac{T_0 \cdot p}{T \cdot p_0} = k \cdot p = k \cdot ba + k \cdot p_{\ddot{u}}$$

in which $k$ is a constant.

In accordance with this, as already mentioned above, when the average gas temperatures and the average barometric pressures are considered constant, the specific gravity $\gamma$ consists of a constant weight portion $k \cdot ba$ and a weight portion $k \cdot p_{\ddot{u}}$ which varies proportionally to the difference in operating over-pressure.

Therefore, in this instance, in order to realize the invention, it is merely necessary to split the load G for the shifting or control member in accordance with the above relationship $\gamma = k \cdot ba + k \cdot p_{\ddot{u}}$ into a constant $G_1$ (corresponding to $k \cdot ba$) and a variable amount $G_2$ (corresponding to $k \cdot p_{\ddot{u}}$). In such case $$\frac{\Delta p}{\gamma}$$

will be constant and the rate of flow Q will be proportional to the flow cross section $f$, i. e., the position of the shifting control member, regardless of the size of $\gamma$, is then an exact measure of the rate of flow Q and can serve as switching magnitude.

In Fig. 1 of the drawing there is diagrammatically shown a simple embodiment for switching according to this principle. As a shifting control member for the reversal of the valve switch (shown in Fig. 4), a float 2 is installed in a throttle opening 3 in the inlet line 1 to the metering system. The float is arranged in such a manner that it can move up and down precisely axially in the vertical throttle opening 3 which is preferably developed in the form of a conical shell or paraboloid. The arrow indicates the direction of gas flow.

The annular gap between the float plate 2 and the throttle 3 is the flow cross section $f$. (Equation 1). The pressure difference $\Delta p$ (active pressure) prevailing on the two sides of the float plate acts on this plate. The float plate, if its size is designated by F, experiences an uplift of the value $F \cdot \Delta p$. If it is to be suspended in the flow, it must be imparted a load G corresponding to this uplift.

This load now consists of a weight 4 constituting its constant portion ($G_1$) and the shifting force of a diaphragm 5 which is under the operating overpressure $p_{\ddot{u}}$ in the line 1 constituting its variable portion ($G_2$).

As on the one hand (G) i. e. ($G_1 + G_2$) represents the shifting force which is imparted the float 2 for a given operating overpressure so that it can control the valve switch, and on the other hand $G_1/G_2 = ba/p_{\ddot{u}}$ consequently $G_1$ and $G_2$ are given magnitudes.

The float plate 2 is provided with a linkage 6, which is connected at 7 to a weight lever 9 which is supported in an oscillatable manner at 8. The lever 9 carries weight 4. This weight produces the load portion $G_1$ on the float plate. Lever 9 is pivotally connected at 10 to a linkage 11 which transmits the shifting force of diaphragm 5 through lever 9 and linkage 6 to the float plate 2. The lever ratio of lever 9 and the size of diaphragm 5 should be so selected that a force of the magnitude $G_2$ is exerted on the float plate 2 by diaphragm 5.

The throttle opening 3 is in this case developed as a double cone shell in order to obtain a good switching impulse. Upon a decrease in the rate of flow, the float plate 2 will drop. As soon as it passes through the narrowmost zone of the throttle and enters the downward widening lower cone part, the uplift will rapidly decrease. The load $G_1 + G_2$ is then greater than the uplift of the float plate and the latter falls suddenly downward with a considerable excess of shifting force to where a stop $2a$ limits its motion. If the rate of flow Q again increases the float will rise. Until it reaches the narrowmost flow cross section at $x$—$x$, its upward motion is considerably accelerated and thus both the excess shifting force required for the actuation of the valve switch and the necessary shifting speed, is attained also in this direction of the control movement.

Conditions should advisedly be so selected that float will move downward to the zone $x$—$x$ and fall therefrom down to its lower limit as soon as the gas flow rate through the main meter reaches its minimum load $Q_{(min)}$ and will move upward as soon as the gas flow rate reaches or slightly exceeds the nominal load of the auxiliary meter.

The drive of the valve switch which effects the actual switching from one meter to the other is actuated by this motion of the flow. It may take place either directly by being carried along by the float as for instance by means of a tilt switch or the like or in any known manner. The various ways in which the motion of the float may be used to actuate the switch is well known in the art and does not constitute part of this invention.

In certain cases which occur, the operating overpressure is small and both the barometric pressure and the temperature, due to their relatively increased influence on the specific gravity of the gas, can no longer be neglected. In such cases, all three determinants of specific gravity, namely operating overpressure, barometric pressure and temperature, must be taken into consideration for the production of the load acting on the shifting member of the control device of the valve switch.

For this purpose, differing from the embodiment in accordance with Fig. 1, the loading weight 4 is arranged in a longitudinally-displaceable manner on lever 9 and connected with the interposition of a motion-reversing device, to an adjusting device which is dependent on the specific gravity and which is also fastened to lever 9.

As specific gravity originator there can be used a vessel having a resilient wall and containing gas enclosed therein, the gas being subjected to the pressure and temperature of the gas to be measured. The volume of the enclosed gas is inversely proportional to the specific gravity of the gas.

One embodiment of this arrangement is shown in Fig. 2.

The swingable lever 9 in this case forms the one arm of a bell crank lever on which weight 4 is arranged in such a manner that it can be easily displaced. The other arm 12 has a supporting bracket 13 on one side for a closed, gas-filled vessel 14 having a resilient bottom 15, and the fulcrum 16 of a bell crank lever 17 on the other side. The latter serves as motion reversing device and is pivotably connected at 18 to the resilient bottom 15 and at 19 to a push-rod 20 which in its turn is connected to weight 4.

The resilient vessel 14 is gas-filled and the gas therein will assume the pressure and the temperature of the gas being measured. This will naturally effect its volume and the movement of the lever system 16, 17, 18, 19 and 20. If the lengths of the rods of the levers as well as the size and the weight and its initial position for $V_0$ are correctly determined and with a suitable development of the resilient vessel 14, the position of 18 will constitute an unequivocal measure of the volume V enclosed therein. The float plate 2 will then at every moment be urged against the gas flow with a force which is proportional to the specific gravity of the gas $\gamma$. The position of the float will then always be an exact measure of the flow Q and can serve as a dependable control for the switch.

Fig. 3 shows a further embodiment of the invention for cases in which the operating overpressure is comparatively high and subject to strong variation.

The adjustment of the float is effected in this case by means of a guide sleeve or the like 21 which is arranged in such a manner that it can be easily displaced on lever 9. This sleeve is controlled with respect to its longitudinal displaceability by a thermometer 22 of suitable construction. The thermometer is fastened to lever 9 by means of the toggle lever 17 pivoted at 16 which reverses the direction of movement of the thermometer deflection and the push rod 20. The diaphragm 5 which is under the operating overpressure is connected to the sleeve 21 by its linkage 11 and exerts a force transverse to this displaceability.

Depending on whether the temperature rises or drops, the sleeve 21, and thus the point at which the force is exerted by diaphragm 5 on lever 9, is displaced in one or the other direction, and therefore the load of the float plate 2 is increased or decreased. It is merely necessary to determine the size and transmission conditions properly in order to have this change proportional to the specific gravity of the gas $\gamma$, and thus the position of the float an exact measure of the rate of flow Q.

One embodiment of the complete set up according to the invention is shown diagrammatically in Fig. 1.

I is the main meter, II the auxiliary meter, III the switching valve and IV its control device. IV corresponds essentially to the embodiment according to Fig. 1 and is arranged in this case in a special housing 23. The variable load is arranged above the shifting member 2. On its lower side there is fastened a plunger 24 which extends through a guide 25 into the switch housing 26 of the switch valve. This switch housing is furthermore in communication with housing 23 through an opening 27.

The switching arrangements per se is not part of the present invention. In this case, for example, it is a double piston slide valve. The slide 28 is movable up and down in a pipe 29 which is provided with two connections 30 and 31, said slide being further under the action of a spring 32 which tends to push it upwards. Its stroke is limited in one direction at the place of penetration of plunger 24 by the housing 23 against which it or a plate 33 fastened to it strikes, and in the other direction by a stop 34 provided on pipe 29. Connection 30 leads into the open air while connection 31 is connected via a line 35 with the space 36 below the weight-loaded diaphragm 37 of valve switch III the motion of which is imparted to the closure member 39 by shaft 38.

At 40, shaft 38 is passed in a gastight manner through a false bottom 41 which forms the lower boundary of space 36. The closure member 39 acts on the one hand together with the seat 42 for the opening or closing of the main meter line 1 and on the other hand together with the seat 43 for the opening or closing of the auxiliary meter line 44. The forces acting on diaphragm 37 assure a completely tight closure.

If the rate of flow of the main meter I falls below its $Q_{(min.)}$ and if, accordingly, the float plate 2 drops down, plunger 24 hits against plate 33 and pushes the double piston slide 28 against stop 34. In this way the connection between the inlet line and space 36 of valve switch III is produced via housings 23 and 26, connection 31 and line 35, so that the operating pressure reaches to below diaphragm 37 and lifts it together with its load until the closure member 39 is seated on seat 42. In this connection, the main meter line 1 is disconnected and the auxiliary meter line 44 connected, in other words, the main meter I is shut off and the auxiliary meter II is placed in operation.

If the consumption again increases and if the flow rate of the auxiliary meter II reaches or exceeds in this connection its rated load, the float plate 2 is now suddenly lifted in the aforedescribed manner and spring 32 presses slide 28 upwards until plate 33 comes against housing 23. In this way, the communication between the two connections 30 and 31 is produced and the gas contained in space 36 of the valve switch discharges into the open air through the diaphragm 37 which drops under its load weight and through connection 30. The closure member 39 which drops down together with diaphragms 37 comes against seat 43 and shuts off line 44 to the auxiliary meter II. The latter comes to a stop while the gas flows to the main meter I and places it in operation.

In this arrangement, only one of the two meters is in operation at any one time and only drives its own counting mechanism. This has the advantage that the coupling of the meters which frequently leads to complications is eliminated and each meter can be installed independently of the other in the manner required or desirable due to the spatial conditions of the place where the meters are to be set up.

Fig. 4 shows by way of example the structural combination of the control in accordance with the invention with the valve switch of a reversing device so as to form a single unit, the control essentially in accordance with Fig. 1 being used.

The housing of this unit consists of two superimposed parts connected with each other with the insertion of a false bottom.

The lower part formed in the manner of a valve housing and arranged in the line leading to the main meter is designated 100 and contains the shifting member arrangement for the reversing device 105—111 of the valve switch. It is provided with a partition wall 45 in which there is the opening 46. A sleeve 47 which, at its upper part, bears the double cone member 80 is movable up and down with a tight seal in the opening 46. It is fastened by means of the bridge 48 to a vertical sleeve 49 which, in its turn, is threaded at 50 in the bottom of housing 100 in such a manner that it can be axially adjusted by screwing the same a greater or lesser amount in the threaded joint. The sleeve 49 bears on top a guide 51 for the lower extension of shaft 83 of the float plate 79.

The false bottom is designated 118. The shaft 83 is movable up and down in a sleeve 52 which is fastened to the false bottom 118 the shaft being sealed at 53. The false bottom 118 has several openings 54. Between it and the upper opening of housing part 100 there is clamped diaphragm 117 which separates the lower housing part 100 from the upper housing part 55 and the parts of the valve switch arranged therein, and bears the closure member for said valve switch. This closure member consists of two plates 56, 57, the lower plate having a central opening 58 while the upper plate bears a cylindrical central passage 59. In the lower housing part 100 a line section 60 is fastened to the opening 46 of partition 45, the upper edge 61 of this line section serves as a lower valve seat of the switching valve and cooperates with plate 56 which is provided on its lower side with a packing ring 62.

The upper valve seat is formed of the upper edge 63 of the cylindrical passage 59 which rests in its uppermost position against a packing gasket 64 provided on the bottom of the false bottom 118 and assures a hermetic closure. The pair of plates 56, 57 are rigidly connected with a crosshead 66 by rods 65 which freely extend through the openings 54 of false bottom 118. This crosshead is seated in an easily upward and downward movable manner in the upper housing part 55 on shaft 115 of the working diaphragm 114 of the valve switch and the crosshead rests against a spring 67 fastened to the shaft 115. The switching diaphragm 114 is firmly clasped to the upper opening of housing 55 by a cover 68. Its control space 113 is connected via a line 112 and the connection 108 to the switch housing 103 of the slide piston control 103—111, said switch housing being in this case arranged on the upper housing part 55. The control member 79 and its connected parts have a weight equal to the above mentioned component $G_1$. A lever 86 is in this case developed as a bell crank lever and cooperates at 70 with the stop 110 of the slide piston 105. A channel 69 provided in the false bottom 118 connects the lower side of diaphragm 82 with the atmosphere. To the outlet connection 71 of the upper housing part 55 there is connected line 121 which leads to the auxiliary meter.

In Fig. 4, the float plate 79 is shown in its lowermost operating position in which it rests by means of shaft 83 against a stop 72 provided in the bottom of the housing. The lever 86, therefore, also has assumed its lower position under the force of diaphragm 82, in which position its free end 70 releases stop 110, the double piston slide 105 comes against stop 111 due to the action of spring 109, and the operating pressure enters the space above the switch diaphragm 114 via connections 108 and line 112.

The diaphragm now drops, due to the equality in pressure prevailing on both of its sides and the weight of the parts suspended on it, and the closure member of the valve switch is now applied with the lower plate 56 firmly against seat 61. The path via the outlet of the lower housing part 100 to the main meter is now shut off and the gas assumes the path designated by the arrows via the upper housing part 55 and its outlet connection 71 to the auxiliary meter.

In this connection, the closure pressure at the valve seat 61 is considerably increased since the rear pressure (outlet pressure) of the auxiliary meter is quickly transmitted through the main meter to the space below the diaphragm 117. Consequently the whole pressure drop at the auxiliary meter becomes additionally effective on this diaphragm in the direction of closure of valve 56, 61.

If the float plate 79 again rises upon an increase in the rate of flow, the free end 70 of lever 86 comes, against the pressure of spring 109, into the other end position in which it connects connections 107 and 108 with each other and thus space 113, above the switch diaphragm 114, with the atmosphere. On account of this, diaphragm 114 moves upward under the action of the operating pressure and carries the closure member of the reversing valve along with it via rods 115 and 65, the said valve thus rising together with plate 56 from seat 61 and coming with seat 63 against packing 64 on the false bottom 118.

In this way the path via openings 54 to the auxiliary meter II is shut off and the gas assumes its path again through the outlet connections of the lower housing part 100 to the main meter I. Also in this case the shifting force of diaphragm 117 acts on the closure pressure of the valve so as to increase it inasmuch as rear pressure of the main meter which is now in operation is transmitted through the auxiliary meter which has stopped, line 121 and connection 71 of the upper housing part to the upper side of the diaphragm 117. Consequently the whole pressure drop at the main gas meter becomes additionally effective on this diaphragm in the direction of closure of valve 63, 64.

If the rate of flow at main meter I drops below its $Q_{(min.)}$, the cycle starts all over again.

The realization of the present invention is not limited to the embodiments described herein and can be varied as desired within the scope of the fundamental concept. In particular, it is not necessary that the shifting control member of the reversing device of the valve switch be a float. It may also be a swinging flap or similar member with a gas impinging surface (as shown in Figs. 5a and 5b).

In order also in this case to realize the arrangement of the shifting member in combination with the constriction of the flow cross-section, there may also be provided for example on the side from which the gas flows in, at the lower part of the flap, an extension 73 running over the entire width of the flap 79 and having the shape of a hollow cylindrical sector with the length of the flap 79 as its radius and a transverse slot 74 and concentric to the hollow cylindrical sector 73 with a small amount of clearance, a partition 75 in the line with a vertical slot 77 which widens from a narrowmost position $x$—$x$ upwards and downwards in the manner of a double cone section.

In connection with the movement of the flap 79 the transverse slot 74 of its hollow cylindrical projection slides over the vertical slot 77 of the partition, the released flow cross section and thus the forces acting on the flap changing in a manner entirely corresponding to that of the floats in the embodiments according to Figs. 1 to 4.

I claim:

1. In a compound gas meter having a gas flow feed line leading to a two-way valve with a main meter being connected to one outlet of said two-way valve and a secondary meter being connected to the other outlet of said two-way valve, the improvement in the means of actuation of the switch-over of the valve from one meter to the other meter at a predetermined rate of gas flow, which comprises a constricted portion in said gas flow feed line, a control member defining a gas-impinging surface positioned for limited movement in said constricted portion of the gas-flow feed line without completely sealing the same from gas flow with said gas-impinging surface facing the direction of gas flow, constant force means connected with said control member for urging said control member against the gas flow, means actuated by said control member for actuating said two-way valve upon limited movement of said control member for the switch-over of the valve from one meter to the other meter, and means responsive to the pressure of fluid in said feed line positioned for urging said control member against said gas flow with a force proportional to the operating pressure of the gas $p_{\ddot{u}}$, whereby the total force urging said control member against said gas flow varies as a function of the specific gravity of the gas.

2. Improvement according to claim 1, in which said control member is positioned in a substantially vertical portion of said gas flow feed line.

3. Improvement according to claim 2, in which said constricted portion of the gas flow feed line is provided with a decreasing cross-section to the middle portion thereof and an increasing cross-section extending out from the middle portion thereof, the narrowest portion of said device being the middle portion thereof.

4. Improvement according to claim 3, in which said control member is positioned for limited movement with its lowest position in front of the narrowest portion of said constricted portion and its highest position beyond said narrowest portion.

5. Improvement according to claim 1, which includes a pivotably mounted weight lever attached to said control member, and in which said constant force means, connected with said control member for urging said control member against the gas flow includes a weight attached to said weight lever, and in which said means responsive to the pressure of the fluid in said feed line includes a diaphragm connected to said weight lever and positioned with one side thereof in pressure-communication with the operating pressure of the gas being measured and the other side thereof in pressure-communication with atmospheric pressure.

6. Improvement according to claim 5, which includes temperature-responsive means positioned in said gas flow feed line for varying the force exerted by said constant force means of said control member with a decrease in force with an increase in the temperature of the gas.

7. Improvement according to claim 1, which includes a pivoted weight lever connected to said control member, a sleeve slidably mounted on said weight lever and connected to said pressure-responsive means, and temperature-responsive means positioned in said gas flow feed line for sliding actuation of said sleeve on said weight lever.

8. Improvement according to claim 1, in which said control member is a float.

9. Improvement according to claim 1, in which said control member is a flap pivotably mounted in said gas flow feed line.

10. Improvement according to claim 1, which includes a pivotally mounted weight lever attached to said control member and in which said constant force means, connected with said control member for urging said control member against the gas flow, includes a weight slidably positioned on said weight lever and includes temperature-responsive means positioned in said gas flow feed line connected to said weight for sliding actuation thereof on said weight lever.

11. Improvement according to claim 10, in which said temperature-responsive means consists of a single resilient enclosed vessel positioned in said gas flow feed line connected with said weight for sliding actuation thereof through a motion reversing linkage, said resilient enclosed vessel additionally comprising said means responsive to the pressure of fluid in said feed line.

12. Improvement according to claim 1, which includes an upper housing, an outlet in said upper housing connecting to said secondary gas meter, a lower two-way valve housing having said two-way valve positioned therein, an outlet in said lower housing connecting to said main gas meter and in which improvement said means for actuating said two-way valve upon limited movement of said control member includes switching means positioned in said upper housing, whereby said switching means actuates said two-way valve between the position defining a first path of gas flow through said lower housing to said main meter, and a second path of gas flow through said upper housing to said secondary meter.

13. Improvement according to claim 12, which includes a diaphragm clamped between said two-way valve housing and said upper housing and an upper and a lower valve plate positioned on the upper and the lower side, respectively, of said diaphragm defining said two-way valve.

14. Improvement according to claim 13, including a line section positioned in said lower two-way valve housing defining a seat for said lower valve plate on its upper edge portion, said line section forming a continuation of said constricted portion of said gas flow feed line and including a false bottom separating said upper housing and said lower two-way valve housing, said false bottom defining a seat for said upper valve plate.

15. Improvement according to claim 14, in which said constricted portion in said gas flow feed line is defined by an adjustable sleeve positioned in said lower two-way valve housing, said adjustable sleeve defining an area of narrowest cross-section in the interior thereof and increasing in cross-section in both an upward and a downward direction.

16. Improvement according to claim 15, including a central sleeve attached to the bottom portion of said lower two-way valve housing, a shaft connected to said control member with the lower end thereof extending in guided engagement in said sleeve and a bridge connecting said adjustable sleeve to said central sleeve.

References Cited in the file of this patent

UNITED STATES PATENTS

| | | |
|---|---|---|
| 1,286,942 | Chrisman | Dec. 10, 1918 |
| 1,845,464 | Weymouth | Feb. 16, 1932 |
| 2,100,495 | Stevenson | Nov. 30, 1937 |
| 2,148,253 | Barge | Feb. 21, 1939 |
| 2,472,090 | Brewer | June 7, 1949 |
| 2,475,630 | Melas et al. | July 12, 1949 |
| 2,564,428 | Ford et al. | Aug. 14, 1951 |
| 2,592,304 | Lubeley | Apr. 8, 1952 |